United States Patent [19]

Klüting

[11] 4,260,178

[45] Apr. 7, 1981

[54] ANCHORAGE AND BUCKLES FOR SAFETY BELTS ARRANGED IN VEHICLES

[75] Inventor: Bernd Klüting, Radevormwald, Fed. Rep. of Germany

[73] Assignee: Keiper Automobiltechnik GmbH & Co. KG, Remscheid, Fed. Rep. of Germany

[21] Appl. No.: 101,058

[22] Filed: Dec. 6, 1979

[30] Foreign Application Priority Data

Dec. 9, 1978 [DE] Fed. Rep. of Germany ....... 2853263

[51] Int. Cl.³ .............................................. B60R 21/10
[52] U.S. Cl. .................................... 280/804; 280/806; 297/473; 297/483
[58] Field of Search ............... 280/801, 802, 804, 806, 280/807, 808; 297/468, 473, 483

[56] References Cited

U.S. PATENT DOCUMENTS 4,063,695  12/1977  Oshikawa ............................. 280/806

FOREIGN PATENT DOCUMENTS

| 7311974 | 10/1974 | France ..................................... 280/801 |
| 2634218 | 2/1978 | Fed. Rep. of Germany ........... 297/468 |
| 2802617 | 7/1979 | Fed. Rep. of Germany ........... 297/473 |
| 1287442 | 8/1972 | United Kingdom ..................... 297/483 |

Primary Examiner—John J. Love
Assistant Examiner—Donn McGiehan
Attorney, Agent, or Firm—Michael J. Striker

[57] ABSTRACT

The anchoring means for safety belt buckles for adjustable motor vehicle seat includes a guiding member in the form of a U-shaped slide shoe engageable with a holding rail secured to the vehicle floor. The slide shoe supports for rotation a gear segment and a pinion in mesh with the gear segment. The pinion is movable in a vertically directed onlong slot and engageable with an arresting projection above the upper end of the oblong slot so that during the accelerated motion of the gear segments which are normally coupled to the belt buckles the segments are arrested and the excessive forces are transmitted to the body of the motor vehicle.

8 Claims, 5 Drawing Figures

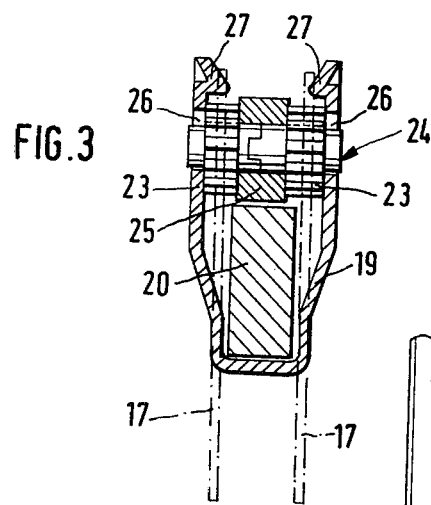
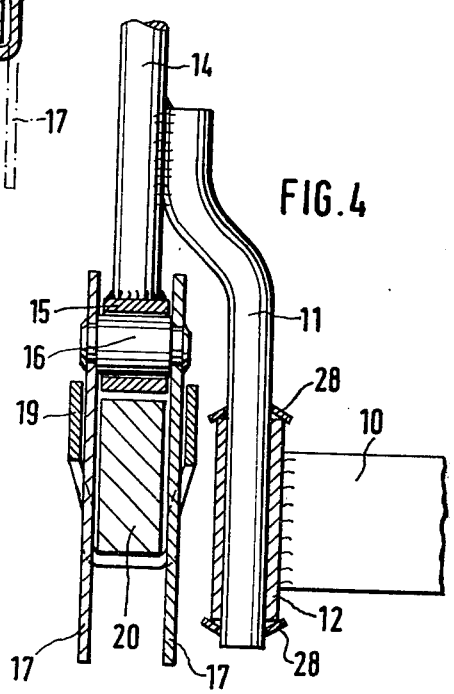
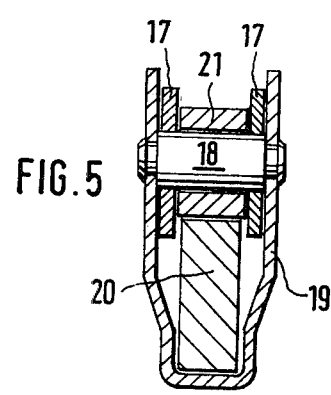

ANCHORAGE AND BUCKLES FOR SAFETY BELTS ARRANGED IN VEHICLES

BACKGROUND OF THE INVENTION

This invention relates generally to safety belt buckles and more particularly it relates to anchoring means for such bucklets assigned to safety belts particularly in motor vehicles having longitudinally and vertically adjustable seats over which the safety belts extend. The achoring means are of the type which include a guiding member assigned to the buckle and a holding member inserable in the longitudinal direction in the guiding member and being firmly connected to the floor of the vehicle in such a manner as to engage the guiding member when the vehicle is involved in an accident.

In the anchoring means for the safety belt buckles of the aforedescribed type the buckle remains in a preset position relative to the motor vehicle seat irrespective of the adjusted position of the latter and performs all adjusting movements of the seat and in the case of an accident remains firmly connected thereto. The belt buckle in one of such known anchoring structures is connected to a guiding member which has the shape of an elbow lever and is pivotably supported on a seat part. The guiding member has a fork-like guiding receptacle and overlaps with the latter a holding member which is also pivotably supported on the motor vehicle body. The holding member in the form of a rail is provided on its lower side with arresting teeth covered by a casing of a plastic material for engaging an arresting tooth on the guiding member piercing in the case of an accident through the plastic casing. The pivot point of the belt buckle on the one hand, and the arresting tooth on the other hand form the end points of the guiding member which is pivotably supported on a seat part. The arresting tooth of the guiding member has the configuration of a pin which normally only slightly clamps the holding member in the guiding receptacle of the guiding member with the joint safety belt. In adjusting the seat, the guiding member is displaced on the holding member which in turn is rotated in response to the seat adjustment slightly upwardly or downwardly. In this manner the safety belt buckle remains in the same position relative to the motor vehicle seat. Nevertheless when the belt is applied, there is a possibility that during the forward adjusting movement of the motor vehicle seat the guiding member may become locked when the belt winder is jammed and the belt itself does not unwind. In addition, the point of attachment of the safety belt buckle on the guiding member moves in the case of an accident to a certain degree forwardly due to the rotary movement of the guiding member on the one hand, and due to the rotary movement of the holding member on the other hand, and consequently the danger of injury of the user of the vehicle is increased.

SUMMARY OF THE INVENTION

It is therefore a general object of the present invention to overcome the aforementioned disadvantages.

More particularly, it is an object of the present invention to provide such an improved anchoring means for safety belt buckles which while maintaining a fixed relation to the motor vehicle seat during adjusting movememt of the latter enable a reliable transmission of excessive pulling forces acting on the buckle in case of an accident, to the body of the motor vehicle.

Another object of this invention is to provide anchoring means of the abovedescribed type which do not practically increase the loop of the safety belt when performing the clamping movement.

In keeping with these objects and others which will become apparent hereafter, one feature of the invention resides in anchoring means for safety belt buckles of the aforedescribed type, in the provision of a gear segment which is pivotably supported on the guiding member, a pinion in mesh with the gear segment and being supported for rotation and for radial displacement on the guiding member, an arresting member fixedly arranged on the guiding member in proximity to the pinion for engaging the same and thus arresting the gear segment when the latter is subject to a jerking movement in the case of accident and radially displaces the pinion, and a safety belt adaptor connecting the buckle to the seat, the adaptor being releasable when subject to excessive forces during the accident.

Since during the normal position adjustment of the seat no jerking acceleration forces are exerted via the adaptor on the gear segment, the pinion which is in mesh with the gear segment remains due to its own weight in a radial position on the guiding member which is spaced apart from the arresting member and consequently the gear segment is permitted to roll on the pinion and the safety belt which is linked to the gear segment can freely adjust its vertical position. During the longitudinal adjustment of the seat the adaptor transmits a pulling or compression force against the gear segment and consequently its pivot point on the guiding member can be longitudinally displaced on the holding or supporting member. Accordingly, while permitting an unobstructed adjustment of the position of the seat a fixed position of the seat belt buckle relative to the seat is maintained. In the case of an accident, a suddenly occuring pulling force is exerted against the belt buckle and the sudden acceleration causes an accelerated rotation of the gear segment upwardly. Such a strong acceleration, however, has the consequence that the gear segment does not roll on the meshing pinion but forces the radially displaceable pinion upwardly so that the teeth of the pinion engage the rigid arresting member on the guiding member. The pulling force resulting from the crash of the vehicle is thus transmitted via the pivot point of the gear segment and the bearing point of the pinion through the guiding member which in turn engages the holding member rigidly connected to the floor of the vehicle. In this manner the loop of the safety belt in the case of an accident is only negligibly increased about the limited axial movement of the pinion. This loop increase, however, is unnoticable inasmuch as the pinion needs to travel approximately about a distance of the depth of its teeth. Since in the case of an accident the loop of the belt remains practically unchanged, the danger of injury of the user of the seat does not occur.

In a preferred embodiment of this invention, the guiding member is in the form of a guiding shoe having a U-shaped cross-section and engaging over the stationary holding member. The U-shaped cross-section of the guiding shoe accomodates a first guiding roller arranged concentrically to the pinion cooperating with the gear segment and on the other end accommodating a second guiding roller movable on the holding member.

The pinion is movable in a substantially vertically directed guiding slot and in order to avoid any obstacles in the free movement of the pinion in its radially directed bearing slot and to insure a reliable return of the pinion to its lower bearing point in the slot, both arms of the U-shaped guiding member are provided with aligned guiding slots and with juxtaposed arresting members in the form of projections engageable into the interstices between the teeth of the pinion. In this manner the pinion is permitted for substantially free movement upwardly when its own weight is overcome.

In order to reduce friction between the sliding shoe and the supporting holding member and also to permit the holding forces to act symmetrically to the anchoring means, according to another feature of this invention the gear segment is assembled of two identical gear segment parts arranged on respective ends of the pivot axle and enclosing therebetween the rail-like holding member as well as the straight face roller which is coaxial with the pinion and the second straight face roller which is coaxial with the pivot axle of the two gear segments. The safety belt buckle is coupled via a connecting rod to a hinge eye provided on a pin interconnecting both gear segment parts.

According to still another feature of this invention the connecting rod between the belt buckle and the gear segment is firmly connected to an adaptor which is releasably connected to the seat frame performing the adjusting movements of the seat and consequently the belt buckle performs the adjusting movements together with the seat. Preferably this adaptor is constituted by a round rod which is inserted into a sleeve, the latter sleeve being rigidly connected by a bridge to the seat frame and insured in axial direction by strip rings which in the case of an accident permit the axial movement of the rod.

A particularly simple and low cost production of the guiding member in the form of a guiding shoe having arresting members is achieved according to a method of this invention when the arresting members are in the form of projections which are stamped out in the walls of the guiding shoe at a small distance above the upper end of the oblong slot for guiding the pinion.

The novel features which are considered as characteristic for the invention are set forth in particular appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a sectional rear view of the anchoring means of FIG. 1 taken along the lines III—III;

FIG. 4 shows a sectional front view of the anchoring means of FIG. 1 taken along the line IV—IV and illustrating the attachment of the buckle to the tooth segment and the releasable adaptor connecting the buckle to the seat frame; and FIG. 5 is a sectional view of the anchoring means of FIG. 1 taken along the line V—V.

DESCRIPTION OF THE PREFERRED EMBODIMENTS

Figure 1:
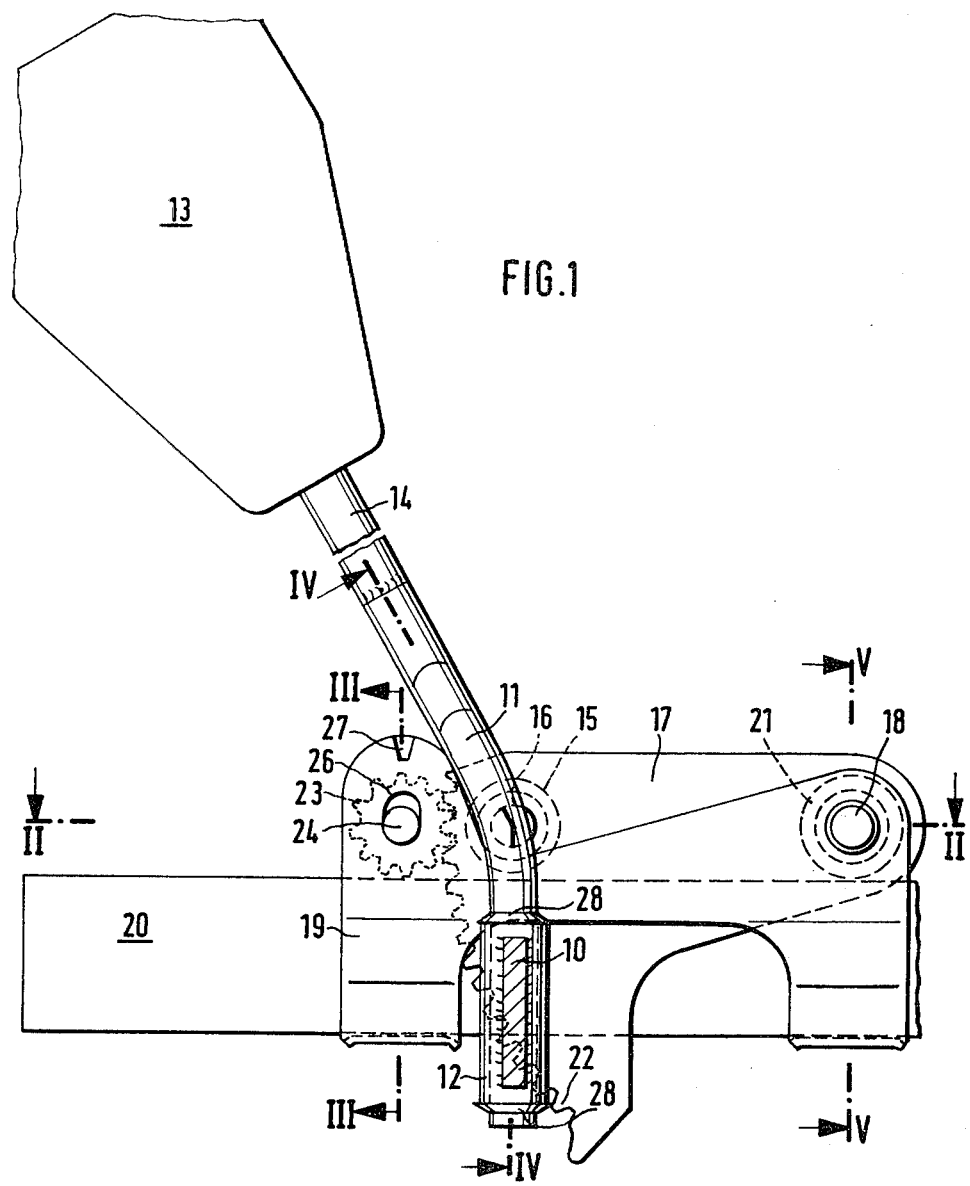
FIG. 1 is a side view of anchoring means for safety belt buckles of this invention including a holding member secured to the floor of the motor vehicle.
Figure 2:
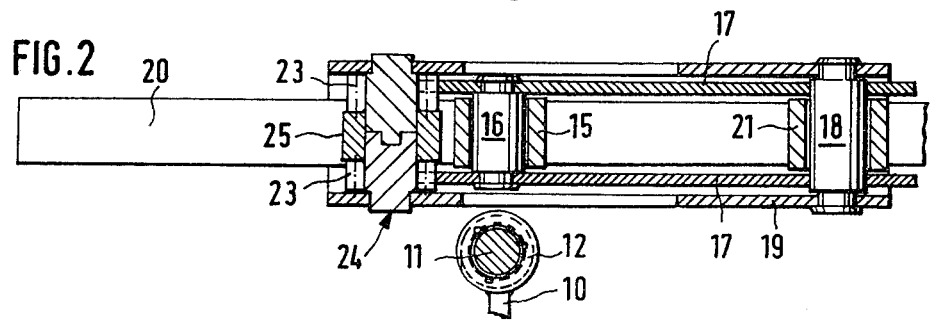
FIG. 2 is a sectional top view of the anchoring means of FIG. 1, taken along the line II—II.

In the illustrated embodiment of this invention, the motor vehicle seat together with its frame is not illustrated for the sake of clarity, and it is only the bridge 10 which rigidly connects a sleeve 12 of an adaptor 11 to the seat frame. A safety belt buckle 13 as shown in FIG. 1 is firmly connected to a connection rod 14 the lower end of which is linked via a hinge eye 15 to a spacer pin 16. The pin 16 is rigidly connected for example by riveting between two parallel gear segment parts 17. Both gear segment parts 17 are supported for rotation on a pivot axle 18 arranged at one end of the guiding member 19. The member 19 is in the form of a shoe having a U-shaped configuration slideably embracing a rail-like supporting or holding member 20 rigidly connected to the floor of the vehicle. The pivot axle 18 also pivotably supports in its central region between the gear segment parts 17 a straight face roller 21 which rolls on the upper side of the holding member 20. The teeth 22 of the respective gear segments parts 17 engage a pinion 23 which may be assembled of two outer sections arranged on the shaft 24 which also supports in its central range a straight face roller 25 moving on the upper side of the holding member 20. The diameter of the roller 25 is slightly larger than the diameter of the crown circle of the pinion 23 so that the latter is prevented from contact on the upper side of the member 20. The end faces of the pinion shaft 24 project respectively into vertically directed oblong slots 26 formed in the lateral arms of the sliding shoe 19. Above the upper end of the oblong slots there are provided arresting members 27 which in this example are stamped out from the lateral walls of the sliding shoe 19 and are spaced apart from the upper end of the guiding oblong slot at such a distance as to enable the engagement with the interstices between the teeth of the pinion 23 when the latter is displaced upwardly.

The lower side of the sliding shoe 19 is open between the pivot axle 18 and the pinion shaft 24 to permit the movement of the gear segment parts 17. Similarly, the section of the upper portion of the lateral walls of the sliding shoe 19 in the range between the pivot axle 18 and the pinion shaft 24 are recessed in such a manner as to permit the connecting rod 14 and the linking pin 16 on the gear segment part 17 to reach without obstructions the position as illustrated in FIG. 1.

The adaptor 11 which at one end is rigidly connected via the connecting rod 14 to the belt buckle 13, at the other end, inserted into the aforementioned sleeve 12 and secured in a fixed axial position to the latter by means of arresting rings 28. The latter rings permit only in the case of excessive pulling loads the displacement of the adaptor 11 whereby both arresting rings are stripped off.

During the adjusting movements of the seat frame the sleeve 12 together with the adaptor 11 and the buckle 13 are moved along due to the rigid connection by the bridge 10 to the seat frame. If the frame is adjusted only in the horizontal direction, the sliding shoe 19 is horizontally displaced on the holding member 20 via the connection of the adaptor 11, the connecting rod 14, the spacing pin 16, the gear segment part 17 and the pivot axle 18 and consequently the belt buckle 13 maintains the same position relative to the seat.

During a vertical adjustment of the seat frame the adaptor 11 causes a lifting or lowering of the spacing pin 16 between the gear segments 17 so that the belt buckle 15 is also lifted or lowered. In doing so, the teeth 22 of respective gear segment parts 17 engage the freely rotatable pinion 23. During the composite adjusting movements of the seat frame in the horizontal and vertical directions there result corresponding movements of the sliding shoe 19 as well as the pivotal movement of the gear segments 17.

In the case of an accident high pulling loads are applied against the belt buckle 13 whereby the spacing pin 16 together with the gear segment parts 17 are abruptly pulled upwardly. Due to this accelerated movement the gear segments 17 do not roll in mesh with the pinion 23 but displace the whole pinion shaft 24 in the guiding slots 26 upwardly until the teeth of the pinion 23 engage the arresting members 27 and a blocking position between the pinion 23, the arresting projection 27 and the gear segments 17 takes place. As a consequence, the accelerated pulling force acting on the spacer pin 16 is transmitted via the pinion shaft 24, the pivot axle 18 and the sliding shoe 19 to the holding member 20 and safe anchoring of the belt buckle 13 to the floor of the vehicle during an accident is thus insured. During this arresting movement of the pinion 23 in the oblong slot 26 the loop of the safety belt is increased only negligibly inasmuch as the arresting projections 27 are located immediately above the teeth of the pinion 23 and consequently a minimum displacement is involved.

It will be understood that each of the elements described above, or two or more together, may also find a useful application in other types of constructions differing from the types described above.

While the invention has been illustrated and described as embodied in a specific example of the anchoring means for safety belt buckles, it is not intended to be limited to the details shown, since various modifications and structural changes may be made without departing in any way from the spirit of the present invention. For example the pinion shaft 24 can be formed as a single piece with the pinion 23 or an additional shaft extending between the lateral walls of the sliding shoe and supporting the roller 25 which in this case is not present on the pinion shaft 24. In this embodiment the pinion 23 is held in its normal position in the guiding slot by its own weight but in a modification the return movement of the shaft 24 can be affected by means of a spring whereby the oblong slot 26 can be oriented in an arbitrary direction.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Anchoring means for safety belt buckles in a vehicle, particularly for safety belts arranged in a motor vehicle and extending over vertically and longitudinally adjustable motor vehicle seat, comprising: a guiding member attached to the belt and a holding member attached to the body of the vehicle and being engageable with said guiding member, a gear segment pivotably supported on said guiding member; a pinion in mesh with said gear segment and supported for rotation and for a radial displacement on said guiding member; an arresting member fixedly arranged on said guiding member in proximity to said pinion for engaging the same and thus arresting said gear segment when the latter is subject to a jerking movement and radially displaces said pinion; and a releasable adaptor connecting said buckle to said seat in a fixed relative position.

2. The anchoring means as defined in claim 1, wherein said guiding member is in the form of a sliding shoe having a U-shaped configuration enclosing said stationary holding member, said guiding shoe supporting for rotation a pair of parallel gear segments, a first guiding roller coaxial with the pivot axis of said segments, and a second guiding roller arranged for rotation at the other end of said sliding shoe above the upper surface of said holder.

3. The anchoring means as defined in claim 2, wherein said sliding shoe includes two juxtaposed oblong slots extending in vertical direction in lateral sides of said shoe to guide said pinion in said radial direction and said arresting member including two opposite projections arranged above the upper ends of respective guiding oblong slots.

4. The anchoring means as defined in claim 2, wherein one of said rollers is coaxial with said pinion and the other roller is coaxial with said pivot axis.

5. The anchoring means as defined in claim 2, wherein said buckle is coupled to said gear segments by a connecting rod linked to a spacer pin between said segments.

6. The anchoring means as defined in claim 5, wherein said adaptor includes a rod connected to said connecting rod and having its free end coupled to bridging means which follow the movement of said seat.

7. The anchoring means as defined in claim 6, wherein said bridging means includes a sleeve rigidly connected to the seat and said adapting rod being inserted into said sleeve and secured thereto by arresting rings releasable in response to excessive forces in axial direction.

8. The anchoring means as defined in claim 1, wherein said arresting member is stamped out in the walls of said driving member.

* * * * *